FIG. I

INVENTORS
B. TODD CRUTCHER III
RONALD D. DODGE

BY Frank C. Leach Jr.
ATTORNEY

Nov. 14, 1967 B. T. CRUTCHER III, ET AL 3,352,398

CHARACTER SELECTION MECHANISM WITHOUT RETURN TO HOME POSITION

Filed June 29, 1966 5 Sheets-Sheet 4

Nov. 14, 1967 B. T. CRUTCHER III, ET AL 3,352,398

CHARACTER SELECTION MECHANISM WITHOUT RETURN TO HOME POSITION

Filed June 29, 1966 5 Sheets-Sheet 5

3,352,398
Patented Nov. 14, 1967

3,352,398

CHARACTER SELECTION MECHANISM WITHOUT RETURN TO HOME POSITION

B. Todd Crutcher III and Ronald D. Dodge, Lexington, Ky., assignors to International Business Machines Corporation, Armonk, N.Y., a corporation of New York Filed June 29, 1966, Ser. No. 561,474
16 Claims. (Cl. 197—16)

ABSTRACT OF THE DISCLOSURE

A high speed selection mechanism has two sets of cams simultaneously rotatable 180° during each actuation of rotation means to produce first and second cycles of operation. Each of the sets of cams is mounted for relative axial movement. During each of the first cycles of operation, a first group of cam followers, which cooperate with one of the sets of cams, is movable by suitable means to determine the axial position of the one set of cam means. During each of the second cycles of operation, a second group of cam followers, which cooperate with the other of the sets of cams, is movable by the same means as moves the first group of cam followers to determine the axial position of the other set of cams. A differential mechanism receives the output of the one set of cams during each of the first cycles of operation and the output of the other set of cams during each of the second cycles of operation. Two of these mechanisms may be utilized with a spherical head printing element wherein the output of the differential means of one of the mechanisms rotates the printing element while the output of the other of the mechanisms tilts the printing element to position a selected character at a printing position.

This invention relates to a high speed selection mechanism, and, more particularly, to a mechanism for high speed selection of type characters for printing by a printing apparatus.

In data processing systems wherein a computer is utilized on a sharing basis with the users being located at distances from the computer, the output information is normally stored on a magnetic tape. The tape is operated at a very high rate of speed when receiving the output information from the computer. In order to transmit the information, which has been stored on the tape from the computer, the information normally is sent to the user over telephone lines. The magnetic tape is operated at a lower speed and is coded to cause actuation of a printing apparatus such as a typewriter, for example, at the user's location.

The rate of transmittal of information from the magnetic tape depends upon the operating speed of the printing apparatus. Thus, the magnetic tape operates at a much lower rate of speed in transmitting information, which has been stored thereon, than in originally receiving information from the computer.

Accordingly, the length of time necessary to transmit information from the magnetic tape at the data processing center to the user is dependent on the rate of printing of the typewriter or other printing apparatus. Thus, both the rental use for the telephone lines and the amount of time required for the user to receive the information are dependent upon the speed at which the printing apparatus or typewriter is capable of operating.

In presently available typewriters having a single element printing head that are utilized in cooperation with magnetic tapes at a data processing center, the speed of operation for printing characters is less than fifteen characters per second. By using the selection mechanism of the present invention with the same type of typwriter having a single element printing head as the printing apparatus, characters may be printed at a rate of speed in the range of thirty to forty characters per second.

Thus, the present invention permits a substantial reduction in the cost of utilizing telephone lines or other types of communication media for transmitting data thereover. Furthermore, the use of the present invention permits the information to be received much quicker than with presently available equipment.

In order to attain a printing or typing speed of thirty or more characters per second with a typewriter utilizing a single element printing head, the selection mechanism of the present invention prevents the single element printing head from returning to a home position. Thus, the printing head is advanced from one selected character to the next.

In prior selection systems in which a typewriter having a single element printing head is used as the printing apparatus, a latch clearance has been required in positioning the latch to select the desired character for printing. During a high speed printing operation wherein thirty or more characters per second are being selected, any latch clearance, however small, produces erratic and uncontrolled motion to the printing element.

The present invention satisfactorily solves this problem by utilizing a mechanical selection mechanism with zero clearance. Thus, the selection control of the present invention is operated without any latch clearance.

An object of this invention is to provide a high speed selection mechanism for use in a printing apparatus or the like.

Another object of this invention is to provide a printing character selection apparatus in which the printing element is not restored to a home position after each printing action.

A further object of this invention is to provide a high speed selection mechanism utilizing a latch without any latch clearance.

The foregoing and other objects, features, and advantages of the invention will be apparent from the following more particular description of preferred embodiments of the invention, as illustrated in the accompanying drawings.

Figure 1:
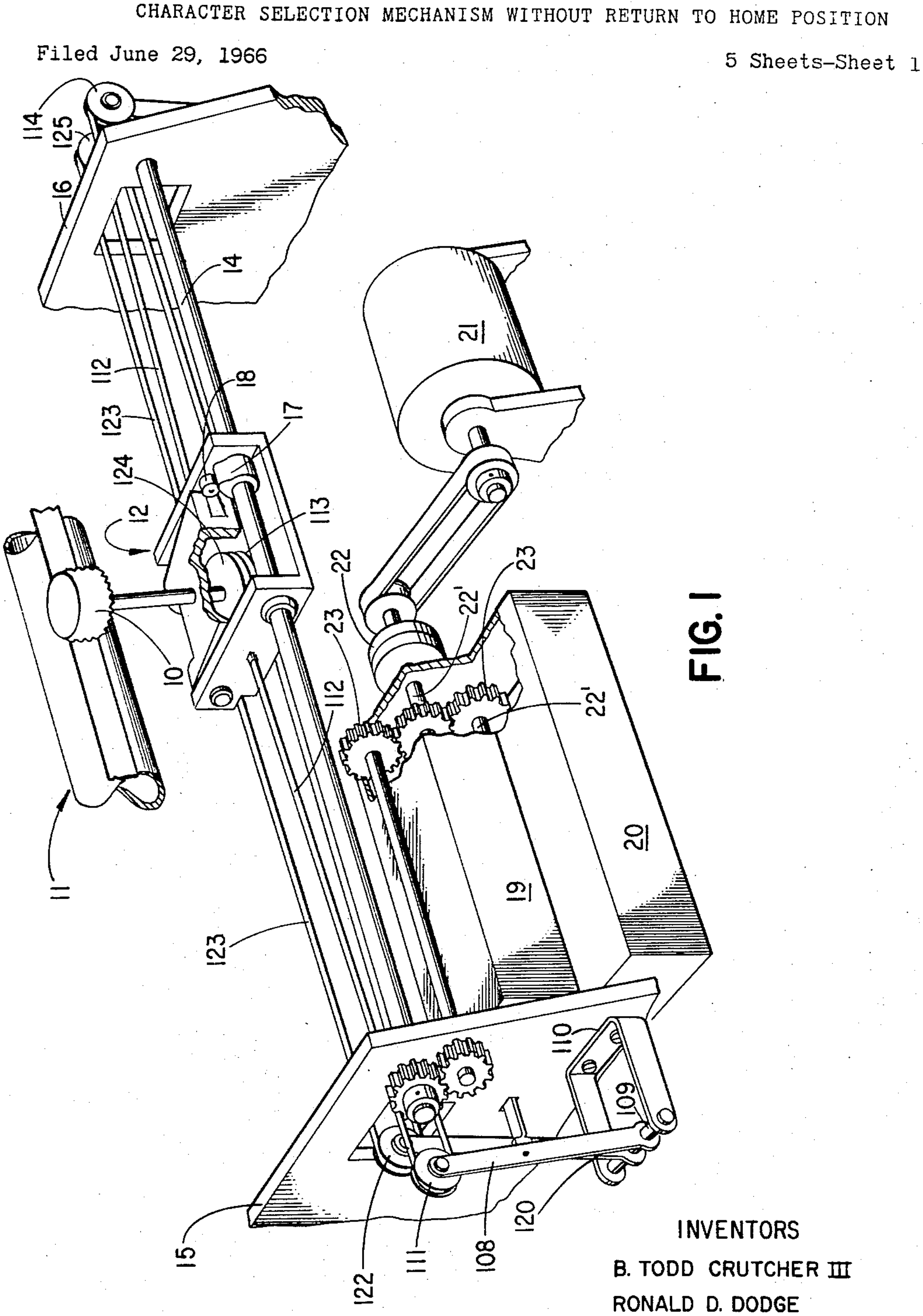
FIG. 1 is a perspective view of a portion of a typewriter having a single element printing head with high speed selection mechanisms of the present invention employed to position the single element printing head.

Referring to the drawings and particularly FIG. 1, there is shown a portion of a typewriter having a single element printing head such as shown and described in U.S. Patent No. 2,919,002 to Palmer. The typewriter includes a single element printing head 10 having characters arranged thereon in vertical columns and horizontal rows. The printing head 10 traverses a platen 11 and prints in normal printing fashion as described in the aforesaid Palmer patent. The printing head 10 is supported on a carriage 12, which is slidable on a rotatable shaft 14.

The single element printing head 10 is adapted to be rotated to select one of the vertical columns for disposition in the vertical plane of a printing position. Likewise, the single element printing head 10 is adapted to be tilted simultaneously with the rotation thereof to select one of the horizontal rows of characters for disposition in the horizontal plane of the printing position. Thus, by simultaneous rotation and tilt of the head 10, one of the characters on the printing head 10 is selected for disposition at the printing position for printing as more particularly described in the aforesaid Palmer patent.

The shaft 14 is journaled in support members 15 and 16 of the typewriter for rotation. During each revolution of the shaft 14, a cam 17, which is fixed on the shaft 14, cooperates with a cam follower 18. Since the cam follower 18 is attached to the single element printing head 10 through its support structure, the printing head 10 will be moved into engagement with the platen 11 to print the selected character.

An output device 19, Which comprises the high speed selection mechanism of the present invention, is supported within the typewriter and is adapted to rotate the printing head 10 for selecting one of the vertical columns for disposition in the vertical plane of the printing position. A similar output device 20 also is supported within the typewriter for tilting the printing head 10 to position one of the horizontal rows of characters on the printing head 10 in the horizontal plane of the printing position. Since the output devices 19 and 20 are identical, only the output device 19, which is shown in detail in FIG. 2, will be described.

As shown in FIG. 1, a motor 21 is connected through a clutch 22 to a rounded end portion 22′ of a square shaft 24 (see FIG. 4) of the output device 19. The motor 21 is connected to the rounded end portion 22′ of the square shaft 24 of the output device 20 and the shaft 14 through gears 23. This arrangement insures that all movements are synchronized with each other since there is a single power source, namely, the motor 21.

Figure 2:
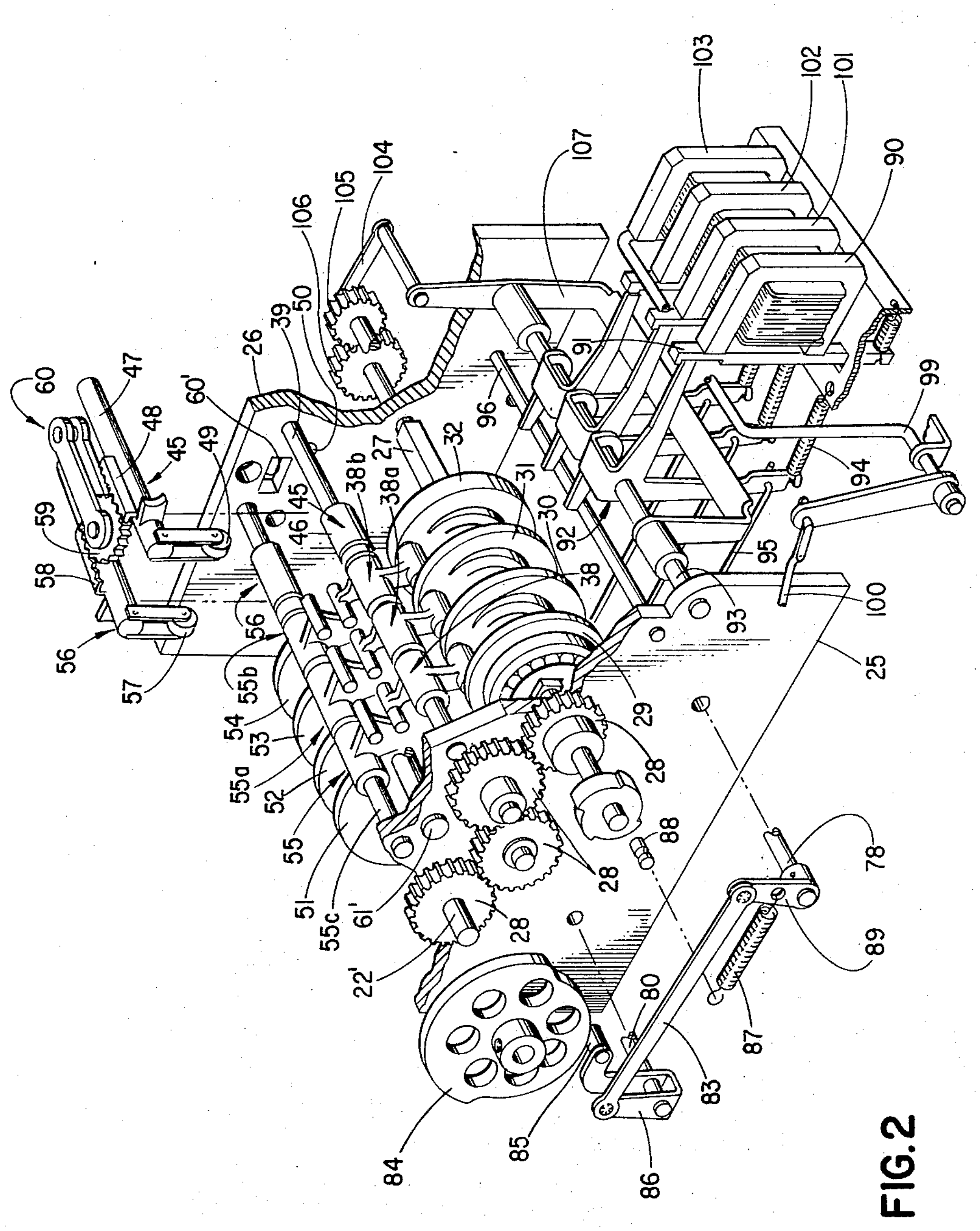
FIG. 2 is a fragmentary perspective view, partly exploded, of a portion of the high speed selection mechanism of the present invention.

The square shaft 24 has its other end rounded so that the square shaft 24 is rotatably mounted in support members 25 and 26 (see FIG. 2). The shaft 24 is connected to a second square shaft 27 by gears 28. The gears 28 are designed to cause simultaneous rotation of the square shafts 24 and 27 at the same speed. The ends of the square shaft 27 also are rounded to permit the square shaft 27 to be rotatably mounted in the support members 25 and 26 in the same manner as the square shaft 24.

Cam members 29, 30, 31, and 32 are mounted on the square shaft 27 for rotation therewith and slidable relative thereto. The cam members 30 and 31 have cam profiles or surfaces on each side thereof. The cam member 29 has a profile or surface only on the side adjacent to the cam member 30. Likewise, the cam member 32 has a cam profile or surface only on the side adjacent to the member 31.

Thus, three pairs of cam profiles or surfaces are formed by the cooperating cam members 29, 30, 31, and 32. The first pair of cam profiles or surfaces is formed on the side of the member 29 adjacent to the member 30 and the side of the member 30 adjacent to the member 29. The second pair of cam profiles or surfaces is formed on the other side of the cam member 30 and the side of the cam member 31 adjacent to the cam member 30. The third pair of profiles or surfaces is formed on the other side of the cam member 31 and the side of the cam member 32 adjacent to the cam member 31.

Figure 4:
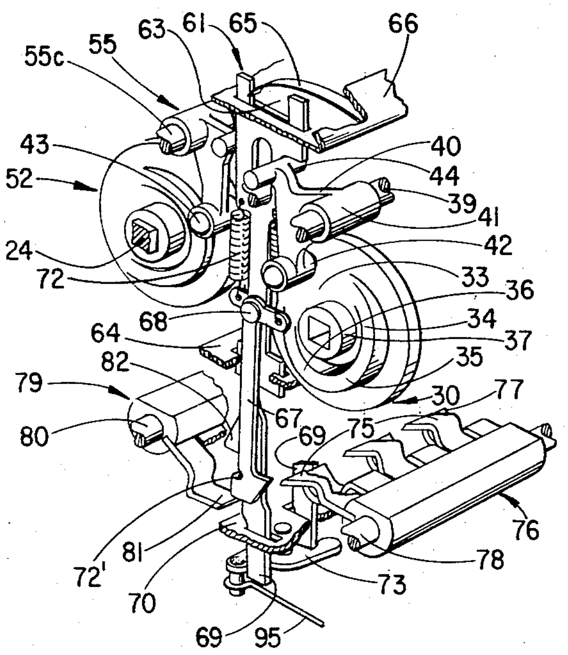
FIG. 4 is a perspective view of a portion of the high speed selection mechanism of the present invention and illustrating the relationship of parts just prior to selecting a cam follower for movement into engagement with the profile of a cam.

Each of the cam profiles has a low dwell 33, a rise 34, a high dwell 35, and a fall 36 as shown in FIG. 4 for the profile on one side of the cam member 30. Each pair of cooperating cam profiles has exactly the same profile. For example, the pair of profiles on the cam member 29 and the side of the cam member 30 adjacent to the cam member 29 have the same rise 34, the same high dwell 35, the same fall 36, and the same low dwell 33.

The distance, which the high dwell 35 of each of the pairs of profiles extends from its cam member, may vary for each pair of profiles. For example, this varying of the high dwells 35 for each pair of cam profiles may be coded according to a binary code, i.e., 1, 2, and 4. In this coded arrangement, the first pair of cam profiles on the members 29 and 30 could have the high dwells 35 extending a distance of one unit from the surfaces of the members 29 and 30, the second pair of cam profiles on the members 30 and 31 could have the high dwells 35 extending a distance of two units from the surfaces of the members 30 and 31, and the third pair of cam profiles on the members 31 and 32 could have the high dwells 35 extending a distance of four units from the surfaces of the members 31 and 32.

Accordingly, the amount of axial movement of the cam members 30, 31, and 32 along the square shaft 27 will depend upon which of the pairs of profiles are engaged by cooperating cam followers. There could be a movement of zero to seven units when the pairs of cam profiles have high dwells of one, two, and four units. It should be understood that the member 29 does not move axially since it abuts against one side of a bearing structure, which has its other side contacting the support member 25.

As shown in FIG. 4, a hub 37 extends from the cam member 30. Similar hubs extend from the sides of each of the members 29, 30, 31, and 32 having a cam profile or surface thereon.

Identical cam followers 38, **38*a*, and 38*b* are slidably and rotatably mounted on a fixed rod 39, which extends between the support members 25 and 26. The cam follower 38 is adapted to engage the pair of cam profiles on the members 29 and 30, the cam follower 38*a* is adapted to engage the pair of cam profiles on the members 30 and 31, and the cam follower 38*b* is adapted to engage the pair of cam profiles on the members 31 and 32**.

As shown in FIG. 4, the cam follower 38 comprises a bracket 40 having a support portion 41, which is slidably and rotatably mounted on the rod 39. The bracket 40 also has a ball retainer portion 42 with a pair of balls 43 (one shown) supported therein. Each of the balls 43 is adapted to cooperate with one of the pair of cam profiles on the members 29 and 30 when an actuating portion 44 of the bracket 40 is moved to cause rotation of the bracket 40 about the rod 39.

When the cam follower 38 is in the position shown in FIG. 4, one of the balls 43 is resting on a radial track, which surrounds the cam profile on the cam member 30, and the other of the balls 43 is resting on a radial track, which surrounds the cam profile on the cam member 29. When the actuating portion 44 is moved downwardly to rotate the bracket 40 about the rod 39, the balls 43 are moved into the low dwells 33 of the pair of cam profiles on the members 29 and 30 so as to be in engagement with the cam profiles during a revolution of the cam members on the square shaft 27. It should be understood that the length of the ball retainer portion 42 is less than two times the diameter of one of the balls 43 so that the balls 43 may be easily moved across the cam members.

The number of the cam followers 38, **38*a*, and 38*b*, which are selected, will determine how much axial movement of the cam members 30, 31, and 32 occurs along the square shaft 27 during rotation of the cam members 29, 30, 31, and 32 due to rotation of the shaft 27. If none of the cam followers 38, 38a, and 38b is actuated by movement of the actuating portions 44, then the output is zero. If all of the cam followers 38, 38a, and 38b are moved, then the output is seven units since the maximum amount of axial movement of each of the cam members 30, 31, and 32** occurs.

If only the cam follower 38 is actuated, then the output is one unit. However, the cam members 30, 31, and 32 will be axially moved because of the axial movement of the cam member 30 due to the balls 43 cooperating with the cam profiles on the members 29 and 30.

If only the cam follower 38a is actuated, the output is two units. When this occurs, only the members 31 and 32 move.

If only the cam follower 38b is actuated, then there is only movement of the cam member 32 and the output is four units. Any axial movement of any of the cam members 30, 31, and 32 along the shaft 27 results in movement of the cam member 32. However, the movement of the cam members 30 and 31 depends on which of the cam followers 38 and 38a is selected for engagement with the pairs of cam profiles.

An output member 45 (shown in two portions in FIG. 2 for clarity purposes) is slidably mounted on the rod 39 by a support portion 46. The output member 45 is responsive to movements of the cam members 30, 31, and 32 along the square shaft 27.

The output member 45 also includes a rod 47 having a rack 48 thereon. The rod 47 has a roller 49 for engagement with the cam member 32 on its side, which does not have a cam profile thereon. The end of the rod 47 extends through a guide opening 50 in the support member 26 to permit axial movement of the output member 45 along the rod 39.

The square shaft 24 has cam members 51, 52, 53, and 54 mounted thereon for rotation therewith and sliding relation relative thereto in the same manner as the cam members 29, 30, 31, and 32 are mounted on the square shaft 27. Three pairs of cooperating cam profiles are formed on the cam members 51, 52, 53 and 54 in the same manner as the three pairs of cam profiles are formed on the cam members 29, 30, 31, and 32. Furthermore, the distance that the high dwells of each pair of cam profiles extends from the side of the cam members is exactly the same as for the cam members 29, 30, 31, and 32. Thus, similar cam profiles are provided on the two sets of cam members in the same arrangement.

However, the cam profiles on the members 51, 52, 53, and 54 are displaced 180° with respect to the cam profiles on the cam members 29, 30, 31, and 32. For example, as shown in FIG. 4 with the low dwell 33 of the cam member 30 ready to receive one of the balls 43 of the cam follower 38 thereon, one of the balls 43 of a cam follower 55, which cooperates with the pair of cam profiles on the members 51 and 52, would be adjacent the high dwell of the cam profile on the cam member 52.

Cam followers 55a and 55b, which are identical to each other and to the cam follower 55, cooperate with the pair of cam profiles on the cam members 52, 53 and 53, 54, respectively, in the same manner as the cam followers 38, 38a, and 38b cooperate with the cam members 29, 30, 31, and 32 and the cam follower 55 cooperates with the members 51, 52. The cam followers 55, 55a, and 55b also are identical to the cam followers 38, 38a, and 38b. The cam followers 55, 55a, and 55b are slidably and rotatably mounted on a fixed rod 55c, which extends between the support members 25 and 26.

An output member 56, which is similar to the output member 45, has a roller 57 cooperating with the cam member 54 on its side, which does not have a cam profile thereon. Thus, any axial movement of the cam members 52, 53, and 54 is transmitted through the output member 56, which has a rack 58 thereon. Axial movement of the member 51 does not occur. This was previously described for the member 29.

Each of the racks 48 and 58 meshes with a pinion gear 59, which is rotatably mounted between a pair of links 60. The links 60 are mounted for sliding relation with respect to the support member 26 and extend through an opening 60' in the support member 26.

The cooperation between the pinion gear 59 and the racks 48 and 58 produces a differential movement of the links 60 during each cycle of operation of the selection mechanism. During each cycle of operation, the square shafts 24 and 27 are rotated a half revolution or 180° by the motor 21.

In each of the first of these two cycles of operation, any of the cam followers 38, 38a, and 38b, which have been selected for engagement with the cooperating pairs of cam profiles on the cam members 29, 30, 31, and 32, move along the rises 34 to the top thereof. It is this movement along the rises 34 that causes the axial movement of the cam members on the shaft 27.

In each of the second of these two cycles of operation, any of the cam followers 55, 55a, and 55b, which have been selected for engagement with the cooperating pairs of cam profiles of the cam members 51, 52, 53, and 54, move along the rises to the top thereof. It is this movement along the rises that causes the axial movement of the cam members on the shaft 24.

Accordingly, if the cam members on the square shaft 27 move one unit due to selection of only the cam follower 38 during a first cycle of operation, the links 60 are moved one unit. If the same amount of movement is created by the members on the square shaft 24 due to selection of only the cam follower 55 during a second cycle of operation, then there is no movement of the links 60 although there is movement of the output members 45 and 56. Thus, the output member 45 returns to its zero or rest position while the output member 56 advances one unit simultaneously.

If there should be no movement of the cam members on the shaft 24 during the second cycle after the cam members on the shaft 27 have moved one unit during the first cycle, then the links 60 will be moved back to the zero position. Likewise, if the members on the shaft 24 move two units due to selection of only the cam follower 55a during the second cycle after the members on the shaft 27 have moved one unit during the first cycle, then the links 60 will advance one additional unit. Thus, the output member 45 returns to its zero position and the output member 56 advances two units simultaneously.

As shown in FIG. 2, the followers 38, 38a, and 38b are disposed closer to the support member 25 than the followers 55, 55a, and 55b. However, the entire length of four cam members 29, 30, 31, and 32 is the same as the four cam members 51, 52, 53, and 54. This is accomplished by either offsetting a portion of the support member 25 or disposing bearing structure between the member 51 and the support member 25 that is greater in thickness than the bearing structure between the cam member 29 and the support member 25. Furthermore, the thickness of the cam member 32 is much greater than the thickness of the cam member 54 in order to compensate for the offset difference. As a result, the member 54 has its side, which acts against the roller 57 of the output member 56, in the same vertical plane as the side of the member 32 acting against the roller 49 of the output member 45 when there is no input to ether set of cam members.

In order to select one or more of the cam followers 38, 38a, and 38b for engagement with the cooperating pairs of cam profiles, it is necessary to move downwardly the actuating portion 44 of each of the selected cam followers 38, 38a, and 38b to cause rotation of the bracket 40 about the rod 39. The same type of downward movement is required for selection of one or more of the cam followers 55, 55a, and 55b for cooperation with the pairs of cam profiles on the cam members 51, 52, 53, and 54.

Referring to FIG. 4, there is shown a ball controller 61, which cooperates with the actuating portion 40 of the cam follower 38. Each of the cam followers **38*a* and 38*b* and each of the cam followers 55, 55*a*, and 55*b* have one of the ball controllers 61 cooperating therewith. The ball controllers 61, which are substantially parallel to each other, were not shown in FIG. 2 in order to lend clarity to the view but a fixed rod 61′, which supports the ball controllers 61, is shown in FIG. 2. The length of the actuating portion 44 is such that the actuating portion 44 will always be disposed within a slot 62 (see FIG. 5) in the ball controller 61 irrespective of the axial movement of the cam members 30, 31, and 32**.

The ball controller 61 is capable of moving only in a vertical direction as it extends through slots in fixed guide members 63 and 64. A spring 65 has one end engaging a portion of the ball controller 61 to prevent it from moving downwardly unless positively actuated. The other end of the spring 65 is secured to a member 66, which is fixed to the support members 25 and 26.

An arm 67 is pivotally connected to one side of the ball controller 61 by a stud 68. An arm 69, which is longer than the arm 67, is pivotally connected to the other side of the ball controller 61 by the stud 68. Both of the arms 67 and 69 extend through the slot in the guide member 64. However, the slot in the guide member 64 is substantially larger than the width of either of the arms 67 and 69 to permit pivotal movement about the stud 68. The lower end of the arm 69 extends through a slot in a fixed guide member 70.

A spring 71 has one end connected to an ear on the arm 67 adjacent its pivotal connection to the ball controller 61 and its other end secured to a portion of the ball controller 61 to constantly urge the arm 67 counterclockwise (as viewed in FIGS. 4–7). A spring 72, which is stronger than the spring 71, has one end attached to an ear on the arm 69 adjacent its pivotal connection to the ball controller 61 and its other end connected to a portion of the ball controller 61 to constantly urge the arm 69 clockwise (as viewed in FIGS. 4–7).

With the spring 72 being stronger than the spring 71, the spring 72 urges the arm 69 clockwise until the arm 69 engages an edge of the slot in the guide member 70 (see FIG. 4). Since the arm 67 has an ear 72′, which extends substantially perpendicular to the remainder of the arm 67, engaging an end surface of the arm 69, the arm 67 must follow the clockwise movement of the arm 69.

Accordingly, when the ball controller 61 is in its inactive or rest position wherein the balls 43 of the cam follower 38 are riding on an outer radial track rather than on the cam profile of the adjacent cam members 29 and 30, the ball controller 61 and the arms 67 and 69 are positioned as shown in FIG. 4. Thus, the force of the spring 72 determines the position of the arms 67 and 69 when the ball controller 61 is at rest.

However, when the latch 73, which is pivotally mounted on the guide member 70, is rotated counterclockwise (as viewed in FIGS. 4–7), the arm 69 is moved counterclockwise (as viewed in FIGS. 4–7) about the stud 68 against the force of the spring 72. When this occurs, the force of the spring 71 causes the arm 67 to follow the counterclockwise movement of the arm 69 by the latch 73.

The counterclockwise rotation of the arms 67 and 69 about the stud 68 moves a protrusion 74 on the end of the arm 67 into the path of a downwardly inclined finger 75 on an actuator 76. The actuator 76 has three spaced, downwardly inclined fingers 75 and three spaced, upwardly inclined fingers 77. The actuator 76 is attached to a shaft 78, which is rotatably mounted in the support members 25 and 26.

A second actuator 79 is mounted on a shaft 80, which is rotatably mounted in the support members 25 and 26. The shafts 78 and 80 are parallel to each other and are actuated simultaneously.

The actuator 79 has three spaced, upwardly inclined fingers 81 (one shown). The actuator 79 also has three spaced, downwardly inclined fingers (not shown), which are the same shape as the fingers 75 of the actuator 76. The end fingers 81, which is disposed in the same vertical plane as the end finger 75 of the actuator 76, is adapted to cooperate with a protrusion 82 on the arm 69. Thus, through the alternate spacing arrangement of the upwardly and downwardly inclined fingers, the actuator 79 has each of its downwardly inclined fingers in the same vertical plane as one of the upwardly inclined fingers 77 of the actuator 76 and each of its upwardly inclined fingers 81 in the same vertical plane as one of the downwardly inclined fingers 75 of the actuator 76.

Whether the end finger 75 engages the protrusion 74 on the arm 67, the end finger 81 engages the protrusion 82 on the arm 69, or neither protrusion is engaged by neither of the fingers 75 and 81 depends upon the positions of the arms 67 and 69 and the vertical position of the ball controller 61.

Each of the other two downwardly inclined fingers 75 on the actuator 76 cooperates with the protrusions 74 on the arms 67 of the ball controllers 61, which are cooperating with the cam followers **38*a* and 38*b*. Each of the other two fingers 81 on the actuator 79 cooperates with the protrusions 82 on the arms 69 of the ball controllers 61, which are cooperating with the cam followers 38*a* and 38*b***.

Because of the position of the cam followers 55, **55*a*, and 55*b*, the ball controllers 61 and the arms 67 and 69 are reversed in position so that a mirror image of the structure of FIG. 4 is employed with each of the cam followers 55, 55*a*, and 55*b*. Accordingly, the upwardly inclined fingers 77 on the actuator 76 cooperate with the protrusions 82 on the arms 69 of the ball controllers 61, which position the cam followers 55, 55*a*, and 55*b*. Similarly, the downwardly inclined fingers (not shown) on the actuator 79 cooperate with the protrusions 74 on the arms 67 of the ball controllers 61, which are cooperating with the cam followers 55, 55*a*, and 55*b***.

The shafts 78 and 80 are interconnected to each other through a link 83 (see FIG. 2) to rotate simultaneously in the same direction. When the shafts 78 and 80 rotate counterclockwise (this is from the position of FIG. 4 to FIG. 5), the finger 75 on the actuator 76 will engage the protrusion 74 on the arm 67 if the spring 71 is controlling the position of the arm 67 and the latch 73 is controlling the position of the arm 69. This occurs when the latch 73 is actuated.

In this position of the arms 67 and 69, the finger 81 on the actuator 79 will not engage the protrusion 82 during counterclockwise rotation of the shaft 80. The finger 81 is not capable of engaging the protrusion 82 on the arm 69 because the protrusion 82 is not in the path of the finger 81.

The simultaneous operation of the shafts 78 and 80 is controlled by a cam 84, which is mounted for rotation with the shafts 24 and 27. Thus, rotation of the cam 84 is timed with rotation of the shafts 24 and 27.

The cam 84 cooperates with a cam follower 85, which is secured to a bracket 86. The bracket 86 is fixed to the shaft 80 for movement therewith and pivotally connects the link 83 to the shaft 80.

A spring 87 has one end attached to a stud 88 on the support member 25. The other end of the spring is connected to a link 89, which has one end fixed to the shaft 78 for rotation therewith. The other end of the link 89 is pivotally connected to the link 83 to provide the connection between the shaft 78 and the link 83.

As the cam 84 rotates counterclockwise in the same direction as the square shaft 24, its high dwell portion will engage the cam follower 85 against the force of the spring 87 and cause clockwise rotation of the shafts 78 and 80. After the cam follower 85 moves from the high dwell portion of the cam 84 to the low dwell portion, the spring 87 causes counterclockwise rotation of the shafts 78 and 80. The profile of the cam 84 is so designed that the shafts 78 and 80 are not actuated until after the arms 67 and 69 have either been actuated by the latch 73 or not actuated thereby.

With the arm 67 having its protrusion 74 engaged by the downwardly inclined finger 75 during downward movement of the finger 75 due to counterclockwise rotation of the shaft 78, the ball controller 61 is moved downwardly (see FIG. 5) since it is connected to the arm 67 through the stud 68. The downward movement of the ball controller 61 results in the bracket 40 pivoting counterclockwise about the rod 39. As a result, the ball 43 is moved from the outer track on the cam member 30 into the low dwell 33 of the cam profile. The arc of the low dwell 33 of the cam profile is sufficient to permit rotation of the actuators 78 and 80 and to determine whether the ball controller 61 is urged downwardly from the time that rotation of the shaft 27 begins.

The actuation of the latch 73 for the ball controller 61, which controls the cam follower 38, is controlled by a magnet 90 (see FIG. 2). When the magnet 90 is energized, its resiliently biased armature 91 is moved toward the magnet 90. When this occurs, a bellcrank 92, which is pivotally mounted on a rod 93 extending between the support members 25 and 26, is released from being held by a lip on the armature 91 and is urged counterclockwise about the rod 93 by a spring 94.

A wire link 95 extends from one end of the bellcrank 92 to one end of the latch 73. Thus, when the bellcrank 92 is moved counterclockwise by the spring 94, the latch 73 is actuated to pivot the arm 69 counterclockwise about the stud 68. This allows the spring 71 to pivot the arm 67 counterclockwise about the stud 68. As a result, the protrusion 74 of the arm 67 is positioned in the path of the end finger 75 on the actuator 76 and the protrusion 82 on the arm 69 is disposed out of the path of the end finger 81 on the actuator 79.

The movement of the bellcrank 92 is limited by a stop 96. Thus, the pivotal movement of the latch 73 is limited to properly position the protrusion 74 on the arm 67 in position for engagement by the finger 75 on the actuator 76.

When the latch 73 is pivoted, it also engages the arms 69 (see FIG. 4) on the ball controller 61 for the cam follower 55. However, no actuation of the ball controller 61 for the cam follower 55 can occur during the time when the set of the cam followers 38, **38*a* and 38*b* is being selected because of the relationship of the fingers on the actuators 76 and 79**.

For example, when the set of the cam follower 55, **55*a*, and 55*b* is being selected, the ball controller 61 for the cam follower 38 also would be moved by the latch 73 if the ball controller 61 for the cam follower 55 is to be selected and the ball controller 61 for the cam follower 38 had not been selected in the prior cycle of operation. However, during this half revolution of the shafts 24 and 27, the actuators 76 and 79 rotate in the opposite direction (clockwise) to that in the previous cycle of operation when the set of the cam followers 38, 38*a*, and 38*b* was being selected. Accordingly, the downwardly inclined finger 75 moves upwardly and rides along an inclined surface 97, adjacent the protrusion 74, on the arm 67 of the ball controller 61 for the cam follower 38**.

If the ball controller 61 for the cam follower 55 is not to be selected, then the latch 73 is not actuated so that there is no movement of the ball controller 61 for the cam follower 38 by the latch 73. If the ball controller 61 for the cam follower 38 had not been selected during the prior cycle of operation, then it is positioned so that the finger 81 rides downwardly along an inclined surface 98 on the arm 69 adjacent the protrusion 82 when the actuators 76 and 79 rotate clockwise.

Figure 5:
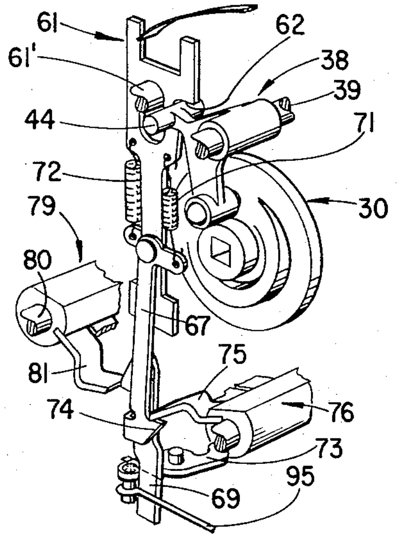
FIG. 5 is a perspective view, similar to FIG. 4 but with some parts omitted, and showing the cam follower moved into engagement with the cam profile.
Figure 6:
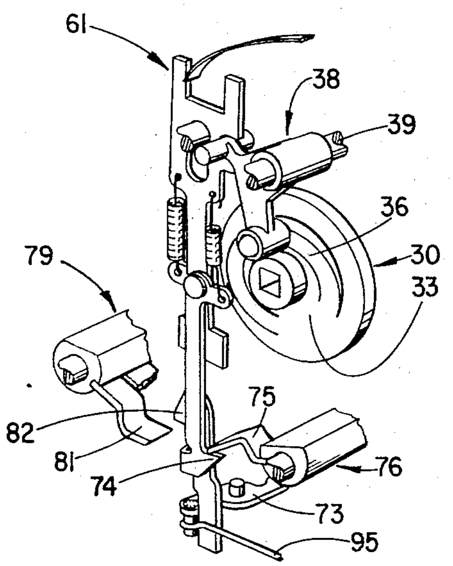
FIG. 6 is a view, similar to FIG. 5, with the cam being rotated 180° from the position of FIG. 5.

Of course, if the ball controller 61 for the cam follower 38 had been selected in the prior cycle of operation, it would be in its lowermost or downward position (FIG. 5). In this position, the end finger 75 merely moves up and away from the protrusion 74 on the arm 67 and the end finger 81 merely moves down and away from the protrusion 82 on the arm 69 when the actuators 76 and 79 rotate clockwise.

Thus, actuation of the magnet 90 results in the latch 73 pivoting. As a result, the two ball controllers 61 for the cam followers 38 and 55 are actuated unless the ball controller for one of the cam followers 38 and 55 had been selected in the previous cycle. However, during a first cycle of operation, which is a half revolution of the shafts 24 and 27, only the ball controller 61 for the cam followers 38 may be moved by the actuators 76 and 79. During a second cycle of operation, which is a second half revolution of the shafts 24 and 27, only the ball controller 61 for the cam follower 55 may be actuated by the actuators 76 and 79.

Actuation of the magnet 90 also causes pivotal movement of a bail 99. The bail 99 is connected through a link 100 to operate the clutch 22 whereby the shafts 24 and 27 are rotated by the motor 21.

It should be understood that a magnet 101 is employed to actuate the latch, which controls the movement of the ball controllers 61 for the cam followers **38*a* and 55*a*, in the same manner as the magnet 90. Similarly, a magnet 102 cooperates with the ball controllers 61 for the cam followers 38*b* and 55*b*. Energization of either of the magnets 101 and 102 also would cause pivoting of the bail 99**.

If none of the magnets 90, 101, and 102 is energized because the input to the selection mechanism is zero whereby zero output is desired, then a fourth magnet 103 is energized. The only function of the magnet 103 is to move the bail 99 to energize the clutch 22 to connect the shafts 24 and 27 to the motor 21.

A reset mechanism is employed to return the bellcrank 92 to its position in which it is hooked under the lip on the armature 91 of the magnet 90. The reset mechanism includes a crank 104, which is connected to a gear 105. The gear 105 meshes with a gear 106, which is on one of the rounded ends of the square shaft 27. Through the reduction between the gears 105 and 106, the gear 105 makes a complete revolution during each cycle of operation, which is a half revolution of the shafts 24 and 27.

The crank 104 is connected to a bail 107. The bail 107 lifts the bellcrank 92 and the other bellcranks, if they have been moved by their attached springs due to energization of their cooperating magnets, to position the end of the bellcrank 92 beneath the lip on the armature 91 and the other moved bellcranks beneath the lips of the armatures of the magnets 101 and 102.

During each cycle of operation of the selection mechanism of the present invention, the shafts 24 and 27 are rotated 180° or one-half revolution. During the first half revolution of the shafts 24 and 27, the cam profile on the cam member 30, for example, moves from the position of FIG. 4 wherein the low dwell 33 of the cam profile is adapted to be engaged by one of the balls 43 to a position in which the high dwell 35 is engaged by the ball 43 if the cam follower 38 has been selected for cooperation with the pair of cooperating cam profiles on the members 29 and 30. However, if the cam follower 38 has not been selected for cooperation with its pair of cooperating cam profiles, then the ball 43 rides outside the cam profile on the outer radial track as is shown for the cam 52 in FIG. 4. During the second half revolution of the shafts 24 and 27, the ball 43 returns to the position of FIG. 5 if the cam follower 38 was selected by riding along the high dwell 35 and the fall 36 of the cam profile or to the position of FIG. 4 if the cam follower 38 was not selected by riding along the outer radial track.

Signals to the magnets 90, 101, 102, and 103 determine whether any of the cam followers 38, **38*a*, and 38*b* are to be selected during the first cycle of operation. Similarly, signals to the magnets 90, 101, 102, and 103 determine whether any of the cam followers 55, 55***a*, and 55*b* are to be selected during the second cycle of operation.

The signal will be coded from a suitable device such as a magnetic tape from a computer and will range from zero to seven in the mechanism shown. Of course, additional cam members with cam profiles could be employed so that any number other than zero to seven may be the result. For example, if there were four pairs of cooperating cam profiles having high dwells of one, two, four, and eight units, then the output would vary from zero to fifteen.

Of course, the magnet 103 is only energized when there is a zero input to the selection mechanism. If any of the other magnets 90, 101, and 102 receives an input, then the magnet 103 is not energized.

As the balls 43 ride along the rises 34 of the cam profiles on the members 29 and 30, they cause the cam members 30, 31, and 32 to axially move along the shaft 27. Of course, the cam members 29, 30, 31, and 32 are rotating as the balls ride up the rises 34 of the cam profiles on the cam members 29 and 30. Thus, the axial movement is a smooth movement.

During the next or second cycle of operation, which is when the followers 55, 55*a*, and 55*b* are being selected, the balls 43 of the cam follower 38 ride along the high dwells 35 and then along the falls 36 from the high dwells 35. As this occurs, the cam members 30, 31, and 32 return to the rest or zero position because of a spring force exerted on the output member 45.

Furthermore, since both of the actuators 76 and 79 move counterclockwise during the first cycle of operation and clockwise during the second cycle of operation, the actuators 76 and 79 are again in the position of FIG. 4 wherein they are ready to have the fingers 75 move downwardly and the fingers 81 move upwardly during the next actuation (counterclockwise) of the actuators 76 and 79.

Figure 7:
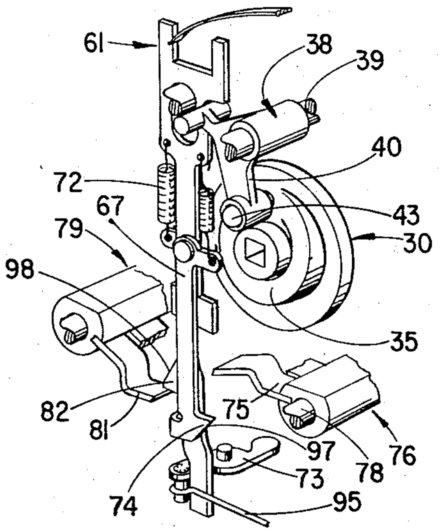
FIG. 7 is a view, similar to FIG. 6, showing the position of the cam follower on the cam profile after 360° of rotation of the cam and just prior to the cam follower either being selected or not selected for repeat engagement with the cam profile.

However, at the end of the two cycles of operation or a complete 360° rotation of the shafts 24 and 27, the balls 43 of the cam follower 38 are located on the low dwells 33 of the cam members 29 and 30. This relationship is shown in FIG. 7 wherein the ball 43 is resting on the low dwell 33 of the came profile on the cam member 30 and the actuators 76 and 79 are ready for counterclockwise movement.

If the cam follower 38 is selected to again engage the pair of cam profiles on the members 29 and 30, the latch 73 will have been pivoted counterclockwise again by energization of the magnet 90. This energization of the magnet 90 occurs before the end of the second cycle of operation (i.e. when the cam members on the shaft 27 are being moved axially) so that the latch 73 is completely pivoted before the ball 43 reaches the position on the low dwell 33 as shown in FIG. 7.

When the latch 73 is pivoted counterclockwise, the protrusion 74 of the arm 67 is disposed in the path of the end finger 75 on the actuator 76 and the protrusion 82 of the arm 69 is disposed out of the path of the end finger 81 on the actuator 79. Since the ball controller 61 of the cam follower 38 is already disposed in its lowermost position, counterclockwise rotation of the actuators 76 and 79 merely brings the finger 75 into contact with the protrusion 74. However, there is no movement of the ball controller 61 since it is already at its lowermost position.

Because of the movement of the protrusion 82 out of the path of the end finger 81 on the actuator 79, the finger 81 cannot contact the protrusion 82. Accordingly, the ball controller 61 of the cam follower 38 remains in its lowermost position and a repeat cycle occurs wherein the cam follower 38 causes axial movement of the cam members 30, 31, and 32 during the first 180° rotation of the cam members 29, 30, 31, and 32 as previously described. During the second 180° of rotation of the cam members 29, 30, 31, and 32, the cam members 30, 31, and 32 return to the zero or rest position in the manner previously described.

If the cam follower 38 is not again selected for engagement with the pair of cam profiles on the cam members 29 and 30 after having been engaged during the previous 360° of rotation of the cam members 29, 30, 31, and 32, then the magnet 90 is not actuated so that the latch 73 is not pivoted. As a result, the spring 72 controls the position of the arms 67 and 69.

The spring 72 urges the members 67 and 69 clockwise about the stud 68. This disposes the protrusion 82 in the path of the end finger 81 on the actuator 79 while moving the protrusion 74 out of the path of the end finger 75 on the actuator 76.

Accordingly, when the actuator 76 and 79 are rotated counterclockwise, the finger 81 engages the protrusion 82 and moves the ball controller 61 upwardly. Since the protrusion 74 is out of the path of the end finger 75, there is no engagement therebetween during downward movement of the finger 75.

Thus, the ball controller 61 is moved upwardly. This causes clockwise rotation of the bracket 40 about the rod 39 to remove the balls 43 from engagement with the low dwells 33 of the pair of cam profiles on the members 29 and 30. As a result, the balls 43 ride on the outer radial track on the cam members 29 and 30 rather than on the cam profiles. Thus, there is no axial movement of the members 30, 31 and 32 due to the cam follower 38.

The output of the links 60 to the spherical printing head 10 is through a plurality of tapes and pulleys. The links 60 are connected to an arm 108 (see FIG. 3), which is pivotally mounted on a rod 109. The rod 109 is attached through a bracket 110 to the support member 15 of the typewriter as shown in FIG. 1.

The arm 108 has a pulley 111 on its upper end. A tape 112, which has one end anchored to a pulley 113 (see FIG. 1), passes around the pulley 111. The pulley 113 is attached to the printing head 10 for causing rotation thereof. The tape 112 passes around an inclined pulley 114, which is normally stationary, and has its other end attached to the carrier 12. Thus, when the links 60 move outwardly from the zero position, the tape 112 causes the pulley 113 to rotate clockwise.

Figure 3:
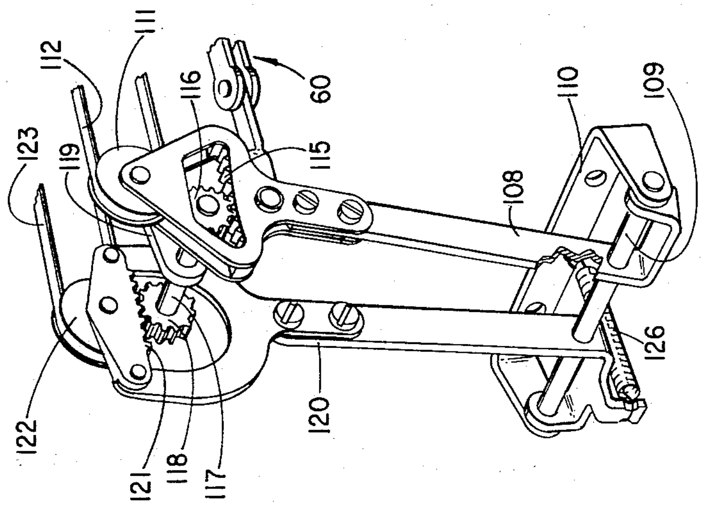
FIG. 3 is an enlarged perspective view of another portion of the high speed selection mechanism of the present invention.

As shown in FIG. 3, the arm 108 has a rack 115 thereon cooperating with a pinion gear 116. The pinion gear 116 is attached to a rod 117, which has a pinion gear 118 on its other end. The rod 117 is supported by a bracket 119, which is attached to the support member 15.

A second arm 120 is pivotally mounted on the rod 109 and has a rack 121 thereon for cooperation with the pinion gear 118. Thus the arm 120 pivots in the opposite direction to the arm 108 because of the rack and pinion gear arrangement on the arms 108 and 120.

The arm 120 has an inclined pulley 122 on its upper end. A tape 123 is wrapped around the pulley 122 and has one end attached to a pulley 124 (see FIG. 1), which is in axial alignment with the pulley 113 and also attached to the printing head 10 for rotation therewith. The other end of the tape extends around a pulley 125, which is adjacent the inclined pulley 114, and is then connected to the carrier 12.

As shown in FIG. 3, a spring 126 has one end attached to the arm 120 and its other end attached to the bracket 110. Thus, the spring 126 provides the spring force to return the output member 45 or the output member 56 to its zero position through the links 60.

When the links 60 are moved outwardly from the zero position to cause clockwise rotation of the pulley 113, the movement in the opposite direction of the arm 120 with respect to the arm 108 permits the pulley 124 to rotate clockwise too. The use of the two tapes 112 and 123 rather than a single tape with a spring as disclosed in the aforesaid Palmer patent eliminates the requirement of the spring of the aforesaid Palmer patent. This two tape arrangement permits faster operation in selecting the character on the printing head 10 than is possible with the single tape and spring arrangement of the aforesaid Palmer patent.

While the pulleys 114 and 125 are normally stationary, they are simultaneously moved whenever shifting is required. This would be necessary to present the other half of the vertical columns on the printing head 10 at the printing position.

The shifting of the pulleys 114 and 125 must occur simultaneously. Thus, suitable means, which are responsive to coded signals, would be utilized.

Furthermore, if desired, the need for shifting in the output device 19 could be eliminated. This would be accomplished by utilizing a sufficient number of the cam members on the shafts 24 and 27 of the output device 19 to permit rotation of the printing head 10 to position any of the vertical columns at the printing position.

The output device 20 utilizes a similar pulley and tape arrangement as the output device 19 for tilting the printing head 10. However, since there is no shifting required because of the smaller number of horizontal rows on the printing head 10 in comparison with the number of vertical columns, it is not necessary for the pulleys 114 and 125 of the output device 20 to be moved. Again, as with respect to the output device 19, the use of two tapes rather than the single tape and the spring of the aforesaid Palmer patent enables a faster disposition of the selected character on the printing head 10 at the printing position.

Figure 8:
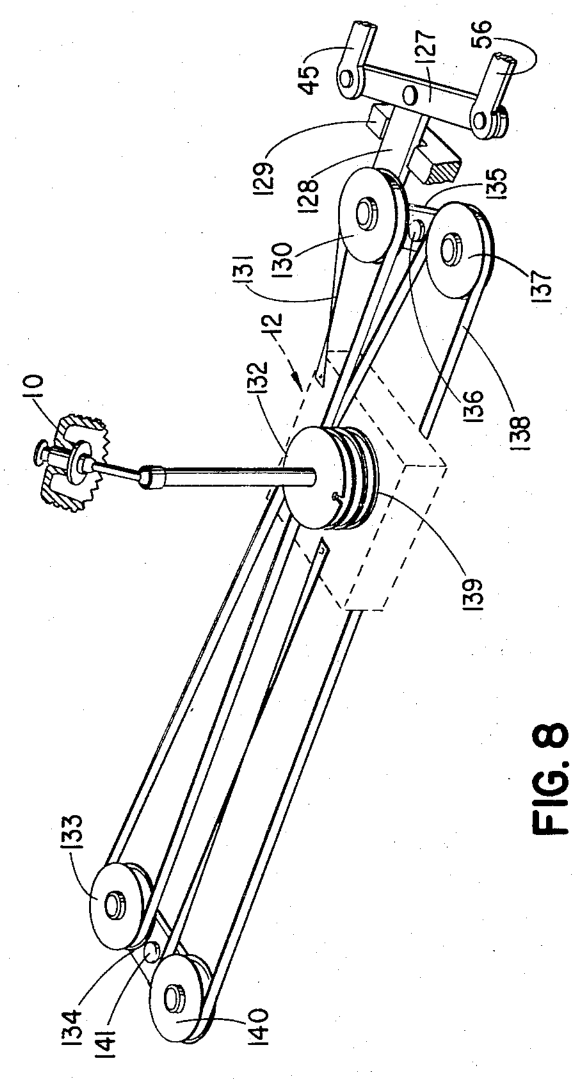
FIG. 8 is a perspective view of another form of the structure for rotating the single element printing head from the high speed selection mechanism of the present invention.

If desired, the racks 48 and 58, the pinion gear 59, and the links 60 could be eliminated along with the pivotal arms 108 and 120 by employing the modification of FIG. 8. Of course, it would still be necessary to utilize a spring, which is similar to the spring 126, to resiliently bias the system so as to insure that each set of cam members returns to its rest or zero position after its cycle of operation.

The modified differential output mechanism of FIG. 8 has the output member 45 connected to one end of a link 127, which is pivotally connected to a link 128, and the output member 56 connected to the other end of the link 127. A guide member 129, which has the link 128 passing through a slot therein, allows movement of the link 128 only in its axial direction.

A pulley 130 is rotatably attached to the link 128. A tape 131, which passes around the pulley 130, has one end attached to the carrier 12 of the printing head 10 and its other end attached to a pulley 132, which causes rotation of the printing head 10. The tape 131 also passes around a pulley 133, which is rotatably mounted on a support bar 134. The pulleys 130, 132, and 133 are disposed in the same horizontal plane.

The link 128 is pivotally connected to a support bar 135, which is pivotally connected by a pin 136 to a fixed portion of the typewriter. A pulley 137 is rotatably mounted on the support bar 135 and has a tape 138 passing therearound. One end of the tape 138 is attached to the carrier 12 and its other is attached to a pulley 139. The pulley 139 is disposed in axial alignment with the pulley 132 and is adapted to rotate simultaneously in the same direction as the pulley 132 and the printing head 10.

The tape 138 also passes around a pulley 140, which is rotatably mounted on the support bar 134. The pulleys 137, 139, and 140 are disposed in the same horizontal plane, which is beneath the horizontal plane in which the pulleys 130, 132, and 133 are disposed.

The support bar 134 is normally disposed in the position shown in FIG. 8. However, when shifting is required, the support bar 134 is rotated about a pin 141, which pivotally connects the bar 134 to a fixed portion of the typewriter. When this occurs, the printing head 10 is rotated 180° in the same manner as previously described when the pulleys 114 and 125 are moved.

When the output member 45 is moved from its rest or zero position, it rotates the link 127 counterclockwise (as viewed in FIG. 8). When this occurs, the pulleys 132 and 139 rotate clockwise to rotate the printing head 10 clockwise. At the same time, the end, which is connected to the output member 56, of the link 127 moves the output member 56 to return it to the zero position.

If the same amount of output is provided by the set of cam members 51–54 to the output member 56 in the second cycle of operation as was provided to the output member 45 by the cam members 29–32 in the first cycle of operation, there will be no movement of the link 128 but only repositioning of the link 127 due to clockwise movement thereof by the output member 56. As a result, the printing head 10 would not be moved so that it would remain in the same position and print the same character. Of course, this is the expected result when the same output is received from the output member 56 as has been received from the output member 45 since the same character has been selected for repeat printing.

Of course, if a larger output is supplied to the output member 56 than to the output member 45, further clockwise rotation of the printing head 10 occurs. Similarly, if a smaller output is received by the output member 56 than was supplied to the output member 45, then the link 127 causes the link 128 to move to the right (as viewed in FIG. 8) so that the pulleys 132 and 139 rotate counterclockwise.

It should be understood that the pulleys 133 and 140 on the support bar 134 must be moved automatically when shifting is necessary in the same manner as the pulleys 114 and 125. Additionally, shifting may be eliminated as previously mentioned for the embodiment of FIGS. 1–7.

The same type of construction would be utilized with the output device 20, which controls the tilt position of the printing head 10. Of course, it is not necessary for the support bar 134 to be shifted since the number of horizontal rows is much less than the number of vertical columns on the printing head. Additionally, the head 10 is not rotated as a result of rotation of the pulleys 132 and 139 but is tilted in the manner described in the aforesaid Palmer patent.

Figure 9:
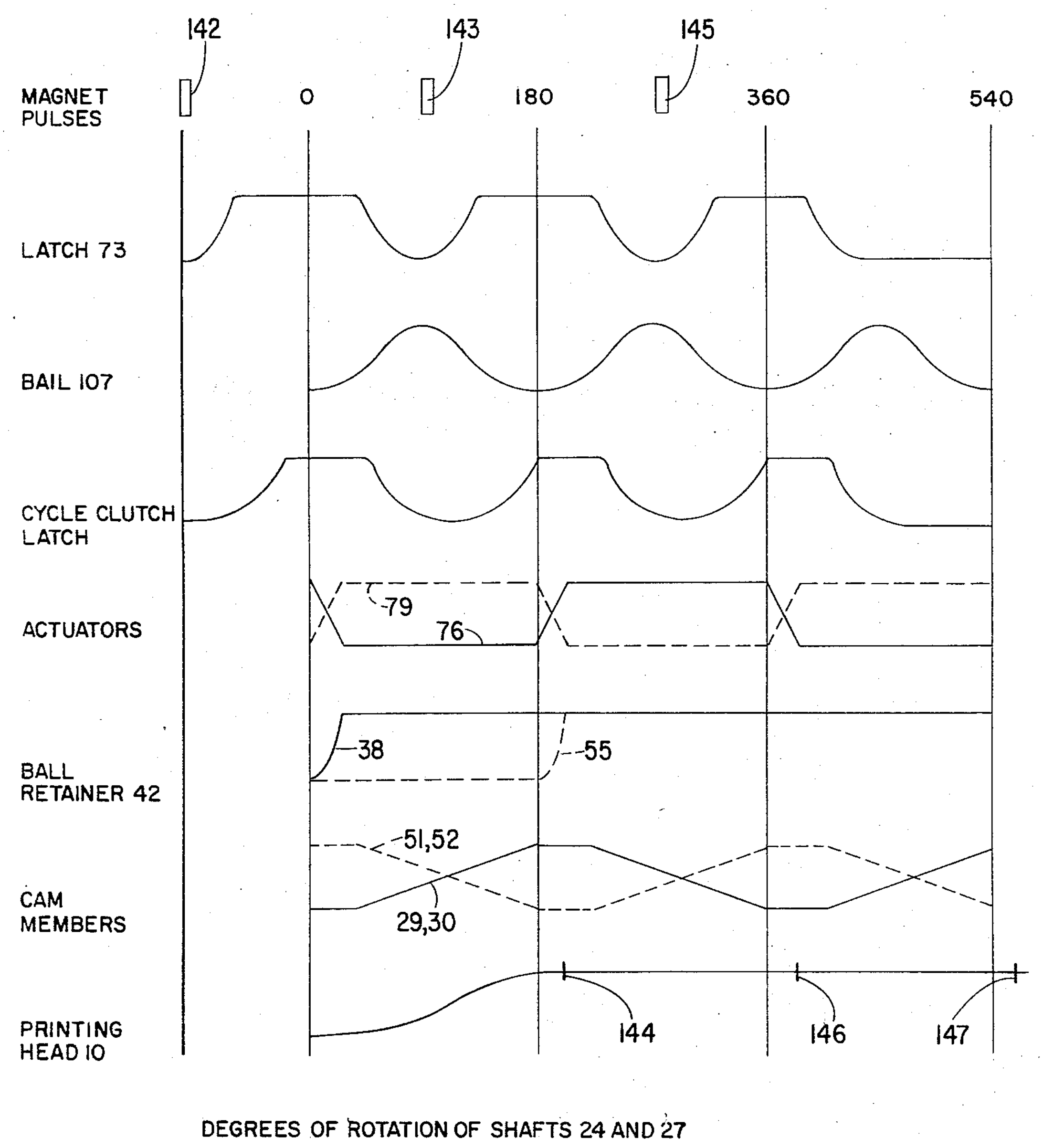
FIG. 9 is a mechanical timing chart.

The operation of the present invention will be considered with particular reference to FIG. 9 wherein the movements of the cam follower 38 and the cam follower 55 and the cooperating structures are shown in timed relation. The operation will be considered with the first signal being a pulse 142 to the magnet 90 for causing selection of the cam follower 38 to cooperate with the pair of cam profiles on the cam members 29 and 30. It will be assumed that the selection mechanism has been stopped and is just beginning operation.

When the first pulse 142 is supplied to the magnet 90, the bail 99 is moved because of movement of the armature 91 to cause movement of the link 100. The link 100 is connected to control the clutch 22.

The clutch 22 includes a pivotally mounted cycle clutch latch, which cooperates with two stops on a clutch sleeve to disconnect the clutch. The cycle clutch latch is resiliently biased into a position to engage one of the stops, which are 180° apart.

However, when the link 100 is actuated by energization of the magnet 90, it pivots a bellcrank, which has been holding a pivoted finger from urging the cycle clutch latch out of the rotating path of the stops on the clutch sleeve. The pivoted finger is urged by a stronger spring than the one acting on the cycle clutch latch. Thus, when pivoting of the bellcrank releases the finger, the cycle clutch latch is moved whereby the clutch sleeve is free to rotate.

When the sleeve is free to rotate, a spring, which surrounds portions of the driving shaft from the motor 21 and the rounded end portion 22' of the driven square shaft 24, is tightened around the driving shaft to connect the driven shaft thereto.

The sleeve has a cam surface thereon to cooperate with a cam follower, which is pivotally attached to the cycle clutch latch. This returns the cycle clutch latch into the path of the next stop and resets the pivoted finger for holding by the bellcrank, which is connected to the link 100.

If the link 100 is again actuated, the cycle clutch latch would be removed from the path of the next stop so that rotation of the shafts 24 and 27 continues. Otherwise, the shafts 24 and 27 are disengaged from the motor 21.

When the pulse 142 is supplied to the magnet 90, the cycle clutch latch of the clutch 22 is allowed to begin movement as shown in FIG. 9. However, rotation of the shafts 24 and 27 does not begin until the position of the shaft indicated by 0° in FIG. 9 because of the time required for the spring of the clutch 22 to tighten on the driving shaft of the motor 21. Thus, in the portion of the ordinate from the time of applying the pulse 142 until 0°, there is no movement of the shafts 24 and 27.

In addition to the pulse 142 causing engagement of the clutch 22 to start the rotation of the shafts 24 and 27 by the motor 21, the energization of the magnet 90 causes pivotal movement of the latch 73 as indicated in FIG. 9. This pivotal movement of the latch 73 causes counterclockwise rotation of the arms 67 and 69 about the stud 68 of the ball controller 61 for the cam follower 38. It also causes the same rotation of the arms 67 and 69 of the ball controller 61 for the cam follower 55.

As shown in FIG. 9, the latch 73 has made its full pivotal movement before rotation of the shafts 24 and 27 begins. This is necessary because the actuators 76 and 79 are rotated as soon as the shafts 24 and 27 start to rotate.

When the clutch 22 connects the motor 21 to the shafts 24 and 27, rotation of the shafts 24 and 27 begins. The actuators 76 and 79 are immediately moved counterclockwise to cause downward movement of the end finger 75 and upward movement of the end finger 81.

Since the latch 73 has pivoted, the protrusion 74 on the arm 67 is positioned for engagement by the end finger 75 on the actuator 76. As a result of this engagement of the finger 75 with the protrusion 74, the ball controller 61 for the cam follower 38 is moved downwardly. The downward movement of the ball controller 61 causes the ball retainer 42 of the cam follower 38 to move into engagement with the low dwells 33 of the pair of cam profiles on the members 29 and 30.

As shown in FIG. 9, the ball retainer 42 does not move immediately into the low dwells 33 of the profiles on the cam members 29 and 30. Instead, there is a slight lag due to the clearance between the finger 75 and the protrusion 74 on the arm 67. However, as soon as this clearance is taken up, the ball retainer 42 moves into the cam profile on the members 29 and 30 from the outer radial track. This movement is completed before the low dwells 33 on the cam profiles of the cam members 29 and 30 rotate past the balls 43.

There is no clearance in the system of the present invention from the previously mentioned clearance of the finger 75 and the protrusion 74 to the links 60. Thus, there is zero clearance since the movements, which occur after the engagement of the finger 75 with the protrusion 74, effect the positioning of the printing head 10. Accordingly, the present invention requires no latch clearance in selecting a character for printing.

With the shaft 27, which has the members 29 and 30 thereon, continuing to rotate, the balls 43 ride up the rises 34 on the cam profiles of the members 29 and 30. As a result, the member 30 moves axially with respect to the member 29 to cause axial displacement of the output member 45 since the member 45 is responsive to the movement of the member 30 through the members 31 and 32.

As the square shafts 24 and 27 rotate a half revolution (180°), the bail 107 is moved from its rest or home position to a maximum distance from its rest position and then returns to the rest position as shown in FIG. 9. The maximum distance of the bail 107 from its rest position occurs at 90° of rotation of the shafts 24 and 27.

When the bail 107 is at its maximum distance from its rest position, the bellcrank 92 is returned to the position in which it is held beneath the lip of the armature 91 of the magnet 90. This movement of the bellcrank 92 causes the latch 73 to return to the home position whereby the ball controller 61 for the cam follower 55 engages against the right edge of the slot in the guide member 70 in which it is disposed. This insures that the ball controller 61 for the cam follower 55 will be properly positioned at the time for selection of the cam follower 55. Because of the engagement between the finger 75 on the actuator 76 and the protrusion 74 on the arm 67, the arm 69 of the ball controller 61 for the cam follower 38 is maintained in the pivoted position to which it was moved by the latch 73 so that it does not return to abut against the left edge of the slot in the guide member 70 in which it is disposed.

As the square shafts 24 and 27 are rotating the half revolution (180°) during the first cycle of operation, the high dwell and the fall of each of the cam profiles on the members 51 and 52 rotate past the balls 43, which are disposed on the outer radial tracks, as shown in FIG. 4.

A second pulse 143 (see FIG. 9) is supplied to the magnet 90 to cause selection of the cam follower 55 during the second cycle of operation of the selection mechanism. The movement of the magnetic tape or other means, which is supplying the pulses or other signals, must be timed so that the pulse 143 does not arrive at the magnet 90 until after the actuators 76 and 79 have moved counterclockwise during the first cycle of operation. The length of the pulse 143 must be sufficient to last until the bellcrank 92 has been returned by the bail 107 to its home position in which it is retained under the lip of the armature 91. This occurs after the bail 107 has started to return to its home or rest position.

When the pulse 143 is supplied to the magnet 90, the clutch 22 remains engaged because the cycle clutch latch is moved out of the position in which it would unlatch the clutch 22 before completion of the first cycle of operation. Accordingly, the magnet 90 must receive the pulse 143 before completion of 180° of rotation of the square shafts 24 and 27.

This insures that the clutch 22 does not become disconnected so that rapid selection of characters can occur. This also insures that the arm 69 of the ball controller 61 for the cam follower 55 is disposed by the latch 73 in position for contact by the downwardly inclined finger on the actuator 79 when the actuators 76 and 79 are rotated clockwise during the second cycle of operation.

The pulse 143 to the magnet 90 causes the latch 73 to again be pivoted. This results in movement of the arm 69 of the ball controller 61 for the cam follower 55 about the stud 68 to position the protrusion 74 on the arm 67 of the ball controller 61 for the cam follower 55 in the path of the downwardly inclined finger on the actuator 79.

Since the ball controller 61 for the cam follower 38 was selected in the first cycle of operation, it remains in the position in which the arm 69 is away from the left edge of the slot in the guide member 70 due to the engagement of the finger 75 with the protrusion 74. Therefore, pivotal movement of the latch 73 does not effect movement of the arms 69 and 67 of the ball controller 61 for the cam follower 38.

With the ball controller 61 for the cam follower 55 having the protrusion 74 on the arm 67 disposed in the path of the downwardly inclined finger on the actuator 79, the continued rotation of the shafts 24 and 27 beyond 180° causes clockwise pivoting of the actuators 76 and 79. This results in the ball controller 61 for the cam follower 55 being moved downwardly by the downwardly inclined finger on the actuator 79 engaging the protrusion 74.

As a result, the ball retainer 42 for the cam follower 55 moves into the low dwells of the cam profiles on the members 51 and 52. There is a slight delay in this movement in the same manner as for the ball retainer 42 of the cam follower 38 because of the clearance between the protrusion 74 and the downwardly inclined finger on the actuator 79.

As the second cycle of operation begins, the balls 43 on the cam followers 38 ride on the high dwells 35 of the cam members 29 and 30 and then ride down the falls 36. At the same time, the balls 43 of the cam follower 55 ride along the low dwells of the profiles on the cam members 51 and 52 and then up the rises.

The arc of the low dwells is sufficient for the balls 43 to enter onto the profiles from the outer radial tracks. Then, as the balls 43 begin to move up the rises 34 on the cam members 51 and 52, there is axial movement of the cam members 52, 53, and 54. This movement is transmitted to the links 60 through the output member 56.

Because of the force of the spring 126 (see FIG. 3), the members 29–32 are held in tight engagement with each other so that the balls 43 will ride on the cam profiles. The spring 126 also holds the members 51–54 in tight engagement with each other.

The printing of the character, which was selected during the first cycle of operation, occurs at 144 as shown in FIG. 9. This printing is during the second cycle of operation of the square shafts 24 and 27. Thus, 144 represents when the printing head 10 is moved into engagement with the platen 11 by the shaft 14 through the cam 17.

At the completion of the second cycle of operation, the balls 43 on the cam follower 38 are ready to enter the low dwells 33 on the cam members 29 and 30. Furthermore, when this occurs, all of the cam members 29 to 32 have returned to their zero or rest position due to the force of the spring 126 and the position of the balls 43 on the cam profiles.

At the same time, the balls 43 on the cam follower 55 have moved to the top of the rises of the cam profiles on the members 51 and 52 and are ready to enter the high dwells. Thus, the maximum amount of axial movement of the members 52–54 on the shaft 24 due to the followers has occurred and the output member 56 has been moved in response thereto.

When a third pulse 145 (see FIG. 9) is supplied to the magnet 90 during the second cycle of operation, it will again cause actuation of the latch 73. It also insures that the clutch 22 will remain engaged for another 180° of rotation of the shafts 24 and 27.

After the actuators 76 and 79 were rotated clockwise during the second cycle of operation, the end finger 75 ceased to engage the protrusion 74 on the arm 67 of the ball controller 61 for the cam follower 38. As a result, the spring 72 returned the arms 67 and 69 to the position of FIG. 4 wherein the arm 69 abutted against the left edge of the slot in the guide member 70 in which it is disposed.

Thus, when the latch 73 again pivots, it again causes pivoting of the arms 67 and 69 of the ball controller 61 for the cam follower 38 in the manner previously described. Since the ball controller 61 for the cam follower 38 already is in its lowermost position, the counterclockwise movement of the actuators 76 and 79 will not result in any movement of the ball controller 61 for the cam follower 38. Instead, the downwardly inclined finger 75 on the actuator 76 will merely come into contact with the protrusion 74 on the arm 67. Of course, because of the pivoting of the latch 73, the protrusion 82 on the arm 69 is again out of the path of the finger 81 during counterclockwise movement of the actuator 79.

Thus, during the next of the first cycles of operation, there is no movement of the ball retainer 42 into or out of the cam profiles on the cam members 29 and 30 when the cam follower 38 has again been selected for cooperation with the cam profiles on the members 29 and 30. This is shown in FIG. 9 wherein the ball retainer 42 remains in its position on the cam profiles.

During the next of the first cycles of operation, the character, which was selected during the second cycle of operation, is printed at 146 (see FIG. 9). This is when the printing head 10 is moved into engagement with the platen 11.

If there are to be no further signals to any of the magnets 90, 101, 102, and 103, the magnetic tape or other source of signals will have a zero signal thereon in order to return the printing head 10 to its home position and to print the character, which was selected during the previous cycle of operation. Therefore, assuming this occurs during the next of the first cycles of operation, there would be no selection of the cam follower 55 or of the cam followers 55*a* and 55*b* during the next of the second cycles of operation.

Accordingly, if there were to be no further signals after the next of the first cycles of operation, then only the magnet 103 would be energized in order to permit printing of the character, which was selected during the next of the first cycles of operation, during the next of the second cycles of operation as previously mentioned. Thus, the latch 73 is not pivoted because the magnet 90 is not energized so that there is no selection of the cam follower 55 during the next of the second cycles of operation.

As the square shafts 24 and 27 complete their 180° of rotation during the next of the first cycles of operation, the members 30, 31, and 32 have been moved axially due to the balls 43 on the cam follower 38 riding along the rises 34 of the cam members 29 and 30. At the same time, the balls 43 on the cam follower 55 rode down the fall on the cam members 51 and 52 and were ready to enter the low dwells on the cam members 51 and 52.

The character, which is selected during the next of the first cycles of operation by movement of the members 30–32, is printed at 147 (see FIG. 9). This is during the next of the second cycles of operation; this is the last cycle after which the mechanism is disconnected from the motor 21.

During this next of the second cycles of operation, the members 30–32 return to their zero or rest positions while the members 52–54 remain at the zero or rest positions since none of the cam followers 55, 55*a*, and 55*b* was selected. As a result, the printing head 10 is restored to its home position.

At the end of the next of the second cycles of operation in which the character is printed at 147 and the printing head 10 returned to its home position, the shafts 24 and 27 cease to rotate due to the cycle clutch latch being positioned to disconnect the clutch 22. However, the clutch 22 is designed so that the shafts 24 and 27 are able to complete 180° rotation before one of the stops on the clutch sleeve engages the cycle clutch latch to disconnect the clutch.

For clarity purposes, this next of the second cycles of operation has not been shown in FIG. 9 other than to show at 147 that the character, which was selected during the next of the first cycles of operation, is printed during the next of the second cycles of operation. This would occur at the end of the printing operation.

It should be understood that one or more of the magnets 90, 101, and 102 may be energized at the same time depending on the desired output. Only the single magnet 90 has been discussed with respect to the timing chart in FIG. 9 in order to simplify discussion of the operation of the present invention.

In order to properly select a single character on the printing head 10 during each cycle of operation, a pulse also must be supplied to the approprite magnet in the output device 20. However, since only the single clutch 22 is required for the two output devices 19 and 20, the magnet 103, the bail 99, and the link 100 may be eliminated from the output device 20. This insures that the two devices 19 and 20 are timed together.

With the selection mechanism of the present invention, there is no clearance after the downwardly inclined finger of the actuator engages the protrusion 74 on the arm 67 of the ball controller 61. Thus, the time for the selection of each character is substantially decreased. Furthermore, the need for the interposers and other similar structure of the aforesaid Palmer patent may be eliminated; this is the structure that requires various latch clearances so that the speed of operation of the single printing head of the aforesaid Palmer patent is not as rapid as when using the present invention.

While the printing head 10 has been shown and described as being spherical as in the aforesaid Palmer patent, any other type of printing head in which the characters are arranged in vertical columns and horizontal rows may be employed. Another suitable example of the printing head 10 is cylindrical printing head shown and described in U.S. Patent No. 3,247,941 to Beattie et al. The cylindrical printing head of the aforesaid Beattie et al. patent may be controlled by the output devices 19 and 20 in the same manner as the spherical printing head 10 of the aforesaid Palmer patent.

While the shafts 24 and 27 have been described as rotating 180° during each cycle of operation, it should be understood that other equal amounts of rotation for each cycle of operation such as 90°, for example, may be employed. Of course, the remainder of the cooperating structure would have to be similarly correlated. With 90° of rotation of the shafts 24 and 27 during each cycle of operation, it would be necessary for each cam profile to comprise two sets of low dwells, rises, high dwells, and falls rather than one set with each set utilizing an arc of 180° rather than 360° as the single set does.

While only a single set of magnets has been shown and described for both sets of cam members, it should be understood that a set of magnets could be employed with each set of cam members. Of course, the cooperating structure would have to be suitable modified such as employing a separate latch for each of the ball controllers 61, for example.

An advantage of this invention is that it permits high speed printing by a typewriter. Another advantage of this invention is that it has zero latch clearance. A further advantage of this invention is its relatively low initial cost. Still another advantage of this invention is its relatively small size.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A high speed selection mechanism comprising:
two sets of cam means with each of said sets of cam means being mounted for axial movement;
each of said sets of cam means having a plurality of profiles;
means to simultaneously rotate said two sets of cam means the same amount during each actuation of said rotating means to produce first and second cycles of operation;
the profiles on one of said sets of cam means being the same as the profiles on the other of said sets of cam means but displaced therefrom an amount equal to the amount of rotation of said sets of cam means during each of the cycles of operation;
first follower means adapted to be selected for cooperation with the profiles on said one set of cam means to determine the axial position of said one set of cam means during each of the first cycles of operation;
second follower means adapted to be selected for cooperation with the profiles of said other set of cam means to determine the axial position of said second set of cam means during each of the second cycles of operation;
and means responsive to the axial positions of each of said sets of cam means.

2. The mechanism according to claim 1 in which said responsive means comprises differential means to receive the output of the axial position of said one set of cam means during each of the first cycles of operation and to receive the output of the axial position of said other set of cam means during each of the second cycles of operation.

3. The mechanism according to claim 1 in which the amount of rotation during each actuation of said rotating means is 180°.

4. The mechanism according to claim 1 in which each of said sets of cam means comprises:
a plurality of members with each pair of adjacent members having the adjacent sides formed with a pair of like cam profiles;
a pair of rotatable shafts;
each of said members of said one set of cam means being mounted on one of said rotatable shafts for axial movement thereon and rotation therewith;
and each of said members of said other set of cam means being mounted on the other of said rotatable shafts for axial movement thereon and rotation therewith.

5. The mechanism according to claim 4 in which
said first followers means comprises a plurality of slidably and rotatably mounted followers with each of said followers adapted to cooperate with one of said pair of profiles of said one set of cam means;
and said second follower means comprises a plurality of slidably and rotatably mounted followers with each of said followers adapted to cooperate with one of said pair of profiles of said other set of cam means.

6. The mechanism according to claim 4 in which
said first follower means comprises:
a first rod;
a plurality of followers with each of said followers adapted to cooperate with one of said pair of profiles of said one set of cam means;
and each of said followers of said first follower means being slidably and rotatably mounted on said first rod;
and said second follower means comprises:
a second rod;
a plurality of followers with each of said followers adapted to cooperate with one of said pair of profiles of said other set of cam means;
and each of said followers of said second follower means being slidably and rotatably mounted on said second rod.

7. The mechanism according to claim 5 in which
each of said pair of profiles of said one set of cam means has a different profile to cause a different amount of axial movement to be imparted to said one set of cam means when said follower of said first follower means is in contact with its cooperating pair of profiles;
each of said pair of profiles of said other set of cam means has a different profile to cause a different amount of axial movement to be imparted to said other set of cam means when said follower of said second follower means is in contact with its cooperating pair of profiles;
means to control selection of said followers of said first follower means for contact with said pair of profiles of said one set of cam means during each of the first cycles of operation whereby the amount of axial movement of said one set of cam means is varied in accordance with the number of selected followers of said first follower means;
and means to control selection of said followers of said second follower means for contact with said pair of profiles of said other set of cam means during each of the second cycles of operation whereby the amount of axial movement of said other set of cam means is varied in accordance with the number of selected followers of said second follower means.

8. The mechanism according to claim 6 in which each of said pair of profiles of said one set of cam means has a different profile to cause a different amount of axial movement to be imparted to said one set of cam means when said follower of said first follower means is in contact with its cooperating pair of profiles;

each of said pair of profiles of said other set of cam means has a different profile to cause a different amount of axial movement to be imparted to said other set of cam means when said follower of said second follower means is in contact with its cooperating pair of profiles;

means to control selection of said followers of said first follower means for contact with said pair of profiles of said one set of cam means during each of the first cycles of operation whereby the amount of axial movement of said one set of cam means is varied in accordance with the number of selected followers of said first follower means;

and means to control selection of said followers of said second follower means for contact with said pair of profiles of said other set of cam means during each of the second cycles of operation whereby the amount of axial movement of said other set of cam means is varied in accordance with the number of selected followers of said second follower means.

9. The mechanism according to claim 8 in which each of said followers of said first follower means comprises a bracket having:

a support portion slidably and rotatably mounted on said first rod;

a ball retainer portion having a pair of balls mounted therein with one of said balls adapted to engage one of the profiles of one of said pair of profiles of said one set of cam means and the other of said balls adapted to engage the other of the profiles of said one pair of profiles of said one set of cam means;

and an actuating portion;

each of said followers of said second follower means comprises a bracket having:

a support portion slidably and rotatably mounted on said second rod;

a ball retainer portion having a pair of balls mounted therein with one of said balls adapted to engage one of the profiles of one of said pair of profiles of said other set of cam means and the other of said balls adapted to engage the other of the profiles of said one pair of profiles of said other set of cam means;

and an actuating portion;

means adapted to move one or more of said actuating portions of said followers of said first follower means during each of the first cycles of operation to move said pair of balls into contact with said pair of cooperating profiles on said one set of cam means during each of the first cycles of operation whereby one or more of said members of said one set of cam means may be axially moved during each of the first cycles of operation;

and means adapted to move one or more of said actuating portions of said followers of said second follower means during each of the second cycles of operation to move said pair of balls into contact with said pair of cooperating profiles on said other set of cam means during each of the second cycles of operation whereby one or more of said members of said other set of cam means may be axially moved during each of the second cycles of operation.

10. The mechanism according to claim 9 in which each of said moving means of said first follower means comprises:

a ball controller for rotating said actuating portion when said ball controller is moved axially, said actuating portion moving said balls into contact with said cooperating pair of profiles of said one set of cam means when said ball controller is moved axially in one direction and away from contact with said cooperating pair of profiles when said ball controller is moved axially in the other direction;

means pivotally connected to said ball controller;

resilient means urging said pivotally connected means to a first position;

means adapted to move said pivotally connected means to a second position;

and means adapted to engage said pivotally connected means during each of the first cycles of operation to cause axial movement of said ball controller, said engaging means engaging said pivotally connected means when said pivotally connected means is in its second position only when said pivotally connected means was in its first position in the prior first cycle of operation whereby said ball controller is moved axially in said one direction, said engaging means engaging said pivotally connected means when said pivotally connected means is in its first position only when said pivotally connected means was in its second position in the prior first cycle of operation whereby said ball controller is moved axially in said other direction;

and each of said moving means of said second follower means comprises:

a ball controller for rotating said actuating portion when said ball controller is moved axially, said actuating portion moving said balls into contact with said cooperating pair of profiles of said other set of cam means when said ball controller is moved axially in one direction and away from contact with said cooperating pair of profiles when said ball controller is moved axially in the other direction;

means pivotally connected to said ball controller;

resilient means urging said pivotally connected means to a first position;

means adapted to move said pivotally connected means to a second position;

and means adapted to engage said pivotally connected means during each of the second cycles of operation to cause axial movement of said ball controller, said engaging means engaging said pivotally connected means when said pivotally connected means is in its second position only when said pivotally connected means was in its first position in the prior second cycle of operation whereby said ball controller is moved axially in said one direction, said engaging means engaging said pivotally connected means when said pivotally connected means is in its first position only when said pivotally connected means was in its second position in the prior second cycle of operation whereby said ball controller is moved axially in said other direction.

11. A printing apparatus including:

a single element printing head having characters arranged on its periphery in rows and columns;

first means to move the printing head to position one of the rows of characters at a printing position;

second means to simultaneously move the printing head to position one of the columns of characters at the printing position;
first and second output devices;
first means to transmit the output of said first output device to one of said first and second moving means for said printing head;
second means to transmit the output of said second output device to the other of said first and second moving means for said printing head;
means to cause actuation of said printing head to print the selected character;
each of said first and second output devices having means to maintain the selected character on said printing head at the printing position until the next character is selected by said first and second output devices after said causing means is actuated;
each of said output devices comprising:
two sets of cam means with each of said sets of cam means being mounted for relative axial movement;
means to simultaneously rotate each of said sets of cam means the same amount during each actuation of said rotation means to produce first and second cycles of operation;
first means selectively cooperating with said one set of cam means during each of the first cycles of operation to determine the axial position of said one set of cam means;
and second means selectively cooperating with said other set of cam means during each of the second cycles of operation to determine the axial position of said other set of cam means;
said first transmitting means transmits the axial position of each of said sets of cam means of said first output device to said one moving means of said first and second moving means for said printing head, said first transmitting means being responsive to the position of said one set of cam means during each of the first cycles of operation and to the position of said other set of cam means during each of the second cycles of operation;
and said second transmitting means transmits the axial position of each of said sets of cam means of said second output device to said other moving means of said first and second moving means for said printing head, said second transmitting means being responsive to the position of said one set of cam means during each of the first cycles of operation and to the position of said other set of cam means during each of the second cycles of operation.

12. The printing apparatus according to claim 11 in which
each of said sets of cam means comprises a plurality of members mounted for axial and rotatable movement;
said members of each of said sets of cam means forms a plurality of pairs of profiles with each of said pairs of profiles of each set of said cam means having a different profile;
each of said sets of cam means have the same pairs of profiles with the profiles of said one set of cam means being displaced from the profiles of said other set of cam means an amount equal to the amount of rotation of said cam means during each of the cycles of operation;
said first selective means includes first follower means cooperating with said pairs of profiles of said members of said one set of cam means during each of the first cycles of operation to determine the axial position of said one set of cam means;
and said second selective means includes second follower means cooperating with said pairs of profiles of said members of said other set of cam means during each of the second cycles of operation to determine the axial position of said other set of cam means.

13. The apparatus according to claim 11 in which
said first moving means for said printing head includes a pair of pulleys having a common axis of rotation;
said second moving means for said printing head includes a pair of pulleys having a common axis of rotation;
said first transmitting means includes:
a first pair of adjacent pulleys responsive to the axial movement of each of said sets of cam means of said first output device;
means connecting said first pair of adjacent pulleys to each other to cause movement of said first pair of adjacent pulleys in opposite directions;
a second pair of adjacent pulleys disposed in spaced relation to said first pair of adjacent pulleys;
first means connecting one of said first pair of adjacent pulleys, one of said second pair of adjacent pulleys, and one of said pair of pulleys of said one moving means of said first and second moving means for said printing head whereby said one pulley of said pair of pulleys of said one moving means of said first and second moving means for said printing head rotates when said one pulley of said first pair of adjacent pulleys is moved;
and second means connecting the other of said first pair of adjacent pulleys, the other of said second pair of adjacent pulleys, and the other of said pair of pulleys of said one moving means of said first and second moving means for said printing head whereby said other pulley of said pair of pulleys of said one moving means of said first and second moving means for said printing head is rotated simultaneously in the same direction for the same amount of rotation as said one pulley of said one moving means of said first and second moving means for said printing head when said other pulley of said first pair of adjacent pulleys is simultaneously moved with said one pulley of said first pair of adjacent pulleys;
and said second transmitting means includes:
a first pair of adjacent pulleys responsive to the axial movement of each of said sets of cam means of said second output device;
means connecting said first pair of adjacent pulleys to each other to cause movement of said first pair of adjacent pulleys in opposite directions;
a second pair of adjacent pulleys disposed in spaced relation to said first pair of adjacent pulleys;
first means connecting one of said first pair of adjacent pulleys, one of said second pair of adjacent pulleys, and one of said pair of pulleys of said other moving means of said first and second moving means for said printing head whereby said one pulley of said pair of pulleys of said other moving means of said first and second moving means for said printing head rotates when said one pulley of said first pair of adjacent pulleys is moved;
and second means connecting the other of said first pair of adjacent pulleys, the other of said second pair of adjacent pulleys, and the other of said pair of pulleys of said other moving means of said first and second moving means for said printing head whereby said other pulley of said pair of pulleys of said other moving means of said first and second moving means for said printing head is rotated simultaneously in the same direction for the same amount of rotation as said one pulley of said other moving means of said first and second moving means for said printing head when said other pulley of said first pair of adjacent pulleys is simultaneously moved with said one pulley of said first pair of adjacent pulleys.

14. The apparatus according to claim 11 in which said first transmitting means includes:

differential means providing an output responsive to the axial position of said one set of cam means during each of the first cycles of operation and responsive to the axial position of said other set of cam means during each of the second cycles of operation;

and said second transmitting means includes:

differential means providing an output responsive to the axial position of said one set of cam means during each of the first cycles of operation and responsive to the axial position of said other set of cam means during each of the second cycles of operation.

15. The apparatus according to claim 13 in which said connecting means for said first pair of adjacent pulleys of said first output device differentially connects said first pair of adjacent pulleys to each other; and said connecting means for said first pair of adjacent pulleys of said second output device differentially connects said first pair of adjacent pulleys to each other.

16. The apparatus according to claim 15 in which said first transmitting means includes:

differential means connected to one of said first pair of adjacent pulleys and providing an output responsive to the axial position of said one set of cam means during each of the first cycles of operation and responsive to the axial position of said other set of cam means during each of the second cycles of operation;

and said second transmitting means includes:

differential means connected to one of said first pair of adjacent pulleys and providing an output responsive to the axial position of said one set of cam means during each of the first cycles of operation and responsive to the axial position of said other set of cam means during each of the second cycles of operation.

References Cited

UNITED STATES PATENTS

| | | | |
|---|---|---|---|
| 487,981 | 12/1892 | Buckingham | 178—34 |
| 2,661,683 | 12/1953 | Beattie. | |
| 2,847,505 | 8/1958 | Kratt et al. | 178—34 |
| 2,919,002 | 12/1959 | Palmer | 197—16 |
| 3,057,210 | 10/1962 | Stoddard | 74—1 |
| 3,155,215 | 11/1964 | Avery | 197—6.7 |
| 3,227,258 | 1/1966 | Pannier et al. | 197—6.6 |
| 3,295,652 | 1/1967 | Sasaki | 197—50 |

ROBERT E. PULFREY, *Primary Examiner.*

E. S. BURR, *Assistant Examiner.*